US007463893B1

United States Patent
McConnell

(10) Patent No.: US 7,463,893 B1
(45) Date of Patent: Dec. 9, 2008

(54) METHOD AND APPARATUS FOR IMPLEMENTING A GPS RECEIVER ON A SINGLE INTEGRATED CIRCUIT

(75) Inventor: Richard Joseph McConnell, Rancho Cucamonga, CA (US)

(73) Assignee: SiRF Technology, Inc., San Jose, CA (US)

( * ) Notice: Subject to any disclaimer, the term of this patent is extended or adjusted under 35 U.S.C. 154(b) by 275 days.

(21) Appl. No.: 09/962,942

(22) Filed: Sep. 24, 2001

Related U.S. Application Data

(60) Provisional application No. 60/234,854, filed on Sep. 22, 2000.

(51) Int. Cl.
*H04Q 7/20* (2006.01)
*B60R 25/10* (2006.01)

(52) U.S. Cl. ............ 455/456.1; 455/556.2; 340/426.19; 342/357.01

(58) Field of Classification Search ............... 455/456.1, 455/456.2, 456.3, 457, 13.4, 41.2, 63.1, 73, 455/84, 501; 340/426.19, 426.22; 341/173; 342/357.01, 357.05, 357.12; 701/213–215, 701/207
See application file for complete search history.

(56) References Cited

U.S. PATENT DOCUMENTS

| | | | |
|---|---|---|---|
| 5,663,734 A | 9/1997 | Krasner | |
| 5,663,735 A | 9/1997 | Eshenbach | |
| 5,748,147 A * | 5/1998 | Bickley et al. | ............... 342/457 |
| 5,781,156 A | 7/1998 | Krasner | |
| 5,812,087 A | 9/1998 | Krasner | |
| 5,825,327 A | 10/1998 | Krasner | |
| 5,831,574 A | 11/1998 | Krasner | |
| 5,841,396 A | 11/1998 | Krasner | |
| 5,874,914 A | 2/1999 | Krasner | |
| 5,884,214 A * | 3/1999 | Krasner | ....................... 701/207 |
| 5,945,944 A | 8/1999 | Krasner | |
| 5,999,124 A | 12/1999 | Sheynblat | |
| 6,002,363 A | 12/1999 | Krasner | |
| 6,016,119 A | 1/2000 | Krasner | |
| 6,052,081 A | 4/2000 | Krasner | |
| 6,061,018 A | 5/2000 | Sheynblat | |
| 6,064,336 A | 5/2000 | Krasner | |
| 6,104,333 A * | 8/2000 | Wood, Jr. | ..................... 341/173 |
| 6,104,338 A | 8/2000 | Krasner | |
| 6,104,340 A | 8/2000 | Krasner | |
| 6,107,960 A | 8/2000 | Krasner | |
| 6,111,540 A | 8/2000 | Krasner | |
| 6,131,067 A | 10/2000 | Girerd | |
| 6,133,871 A | 10/2000 | Krasner | |
| 6,133,873 A | 10/2000 | Krasner | |
| 6,133,874 A | 10/2000 | Krasner | |

(Continued)

OTHER PUBLICATIONS

Marketing Material: Qualcomm CDMA Technologies - Integrated Solutions -- MGP6200™Multimode GPS Processor (8 pages) Dste not available, mrk.

(Continued)

*Primary Examiner*—Melur Ramakrishnaiah
(74) *Attorney, Agent, or Firm*—The Eclipse Group LLP

(57) ABSTRACT

The present invention discloses a method and apparatus for allowing for GPS receiver functions and GPS digital processing functions to co-exist and function optionally or nearly optimally while in close proximity on a common die.

19 Claims, 3 Drawing Sheets

U.S. PATENT DOCUMENTS

| | | | |
|---|---|---|---|
| 6,150,980 | A | 11/2000 | Krasner |
| 6,185,427 | B1 | 2/2001 | Krasner |
| 6,208,290 | B1 | 3/2001 | Krasner |
| 6,208,291 | B1 | 3/2001 | Krasner |
| 6,215,441 | B1 | 4/2001 | Moeglein |
| 6,215,442 | B1 | 4/2001 | Sheynblat |
| 6,236,354 | B1 | 5/2001 | Krasner |
| 6,239,742 | B1 | 5/2001 | Krasner |
| 6,259,399 | B1 | 7/2001 | Krasner |
| 6,272,430 | B1 | 8/2001 | Krasner |
| 6,289,041 | B1 | 9/2001 | Krasner |
| 6,307,504 | B1 | 10/2001 | Sheynblat |
| 6,313,786 | B1 | 11/2001 | Sheynblat |
| 6,314,308 | B1 | 11/2001 | Sheynblat |
| 6,356,738 | B1 * | 3/2002 | Schneider et al. .......... 455/41.2 |
| 6,377,209 | B1 | 4/2002 | Krasner |
| 6,384,774 | B1 * | 5/2002 | Mutoh et al. ........... 342/357.06 |
| 6,408,196 | B2 | 6/2002 | Sheynblat |
| 6,411,254 | B1 | 6/2002 | Moeglein |
| 6,411,892 | B1 | 6/2002 | Van Diggelen |
| 6,417,801 | B1 | 7/2002 | Van Diggelen |
| 6,421,002 | B2 | 7/2002 | Krasner |
| 6,429,814 | B1 | 8/2002 | Van Diggelen et al. |
| 6,433,731 | B1 | 8/2002 | Sheynblat |
| 6,453,237 | B1 | 9/2002 | Fuchs et al. |
| 6,484,097 | B2 | 11/2002 | Fuchs et al. |
| 6,487,499 | B1 | 11/2002 | Fuchs et al. |
| 6,510,387 | B2 | 1/2003 | Fuchs et al. |
| 6,542,821 | B2 | 4/2003 | Krasner |
| 6,583,757 | B2 | 6/2003 | Krasner |
| 6,597,311 | B2 | 7/2003 | Sheynblat |
| 6,728,517 | B2 * | 4/2004 | Sugar et al. ................... 455/73 |

OTHER PUBLICATIONS

Marketing Material: uNav Microelectronics -- uN9x18 Low Power, High Performance GPS Receiver Chipste/uN9x18 GPS Receiver Solution (9 pages), dste not available, mrk.

Marketing Material: uNav Microelectronics, uN9x18 Low Power, High Performance GPS Receiver Chipset (2 pages), date not available, mrk.

Marketing Material: Global Locate -- Hammerhead II™, Single Chip AGPS Solution (2 pages), date not available, mrk.

Marketing Material/Press Release: Broadcom Introduces Advanced Single-Chip GPS Solution for Mobile Application (3 pages), date not available, mrk.

Marketing Material/White Paper: Snap Track: A Qualcomm Company - Snap Track's Wireless Assisted GPS™(A-GPS) Solution Provides the Industry's Best Location System - Location Technologies for GSM, GPRS and WCDMA Networks (Qualcomm CDMA Technologies: Enabling the Future of Communications) (4 pages) date not available, mrk.

New Fast GPS Code Acquisition Using FFT, Electronic Letters, vol. 27 No. 2, pp. 158-160 (1991) (2 pages), date available, mrk.

Novel Fast GPS/GLONASS Code Acquisition Technique Using Low Update Rate FFT, Electronic Letters, vol. 28 No. 9, pp. 863-865 (3 pages), date not available, mrk.

* cited by examiner

METHOD AND APPARATUS FOR IMPLEMENTING A GPS RECEIVER ON A SINGLE INTEGRATED CIRCUIT

CROSS-REFERENCE TO RELATED APPLICATIONS

This application claims priority under 35 U.S.C. § 119(e) of U.S. Provisional Patent Application No. 60/234,854, filed Sep. 22, 2000, entitled "METHOD AND APPARATUS FOR IMPLEMENTING A GPS RECEIVER ON A SINGLE INTEGRATED CIRCUIT," by Richard J. McConnell, which application is incorporated by reference herein.

BACKGROUND OF THE INVENTION

1. Field of the Invention

The present invention relates in general to the implementation of a GPS receiver and in particular to the method and apparatus for implementing a GPS receiver on a single integrated circuit.

2. Description of the Related Art

Almost all modern wireless products use a radio section coupled to a digital section. These two sections are often constructed using dissimilar technologies, to optimize differing constraints for each function. A great deal of effort has been expended in the industry to decrease the size of the implementations. Users of GPS technology often integrate the GPS receivers into other functions, such as cellular handsets, and these users demand as small a size as possible for the GPS function.

A system where the radio section and the processing section are constructed on a common die can be designed to be extremely small, relative to current implementations. The term "common die" means these two functions are constructed together and when used they are not cut apart and mounted separately, but remain together as a single integrated circuit. In the past the technologies used to construct the two functions have made it difficult to realize these two functions as a single integrated circuit on a common substrate, and use that integrated circuit to construct a GPS receiver.

Design techniques have been developed to allow for the possibility of the rf and digital operating on a common substrate, and also allow for these two functions to have the necessary functionality needed to implement a fully functional GPS receiver.

This invention addresses the issues that arise when a digital section is in close physical and electrical proximity to a sensitive radio receiver. When the digital section is operating it can, and usually does, create a great deal of noise that can interfere with the operation of the radio receiver. Standard methods used in the industry to alleviate these issues do not work well enough when the radio section and the digital section are constructed on the same substrate, in an integrated circuit. The standard techniques of spatial separation, and shielding are not practical, and integrated circuit techniques such as isolating the various circuit functions with ground rings or trenches are not effective enough. Other techniques need to be created to allow adequate performance of the GPS receiver. GPS receivers are particularly sensitive receivers, and extra care must be made to allow them to operate without reduced sensitivity.

It can be seen, then, that there is a need in the art for a method of reducing the effects of the coupling of noise from one function in an integrated GPS receiver to another function.

SUMMARY OF THE INVENTION

To minimize the limitations in the prior art, and to minimize other limitations that will become apparent upon reading and understanding the present specification, the present invention discloses a method and apparatus for allowing for GPS receiver functions and GPS digital processing functions to co-exist and function optimally or nearly optimally while in close proximity on a common die.

It is an object of the present invention to reduce the effects of the coupled noise by implementing a system that allows for the reception and processing of the GPS signals where there are two fundamentally different operation modes of the system. One mode is a state where satellite data is collected, and the processes that generate noise are largely inactive, and another state where the collected data is processed, and the noise that is generated in this state is ignored by the data collection function. The system alternates between these two modes to perform the functions to generate position information.

BRIEF DESCRIPTION OF THE DRAWINGS

Referring now to the drawings in which like reference numbers represent corresponding parts throughout.

DETAILED DESCRIPTION OF THE DRAWINGS

Figure 1:
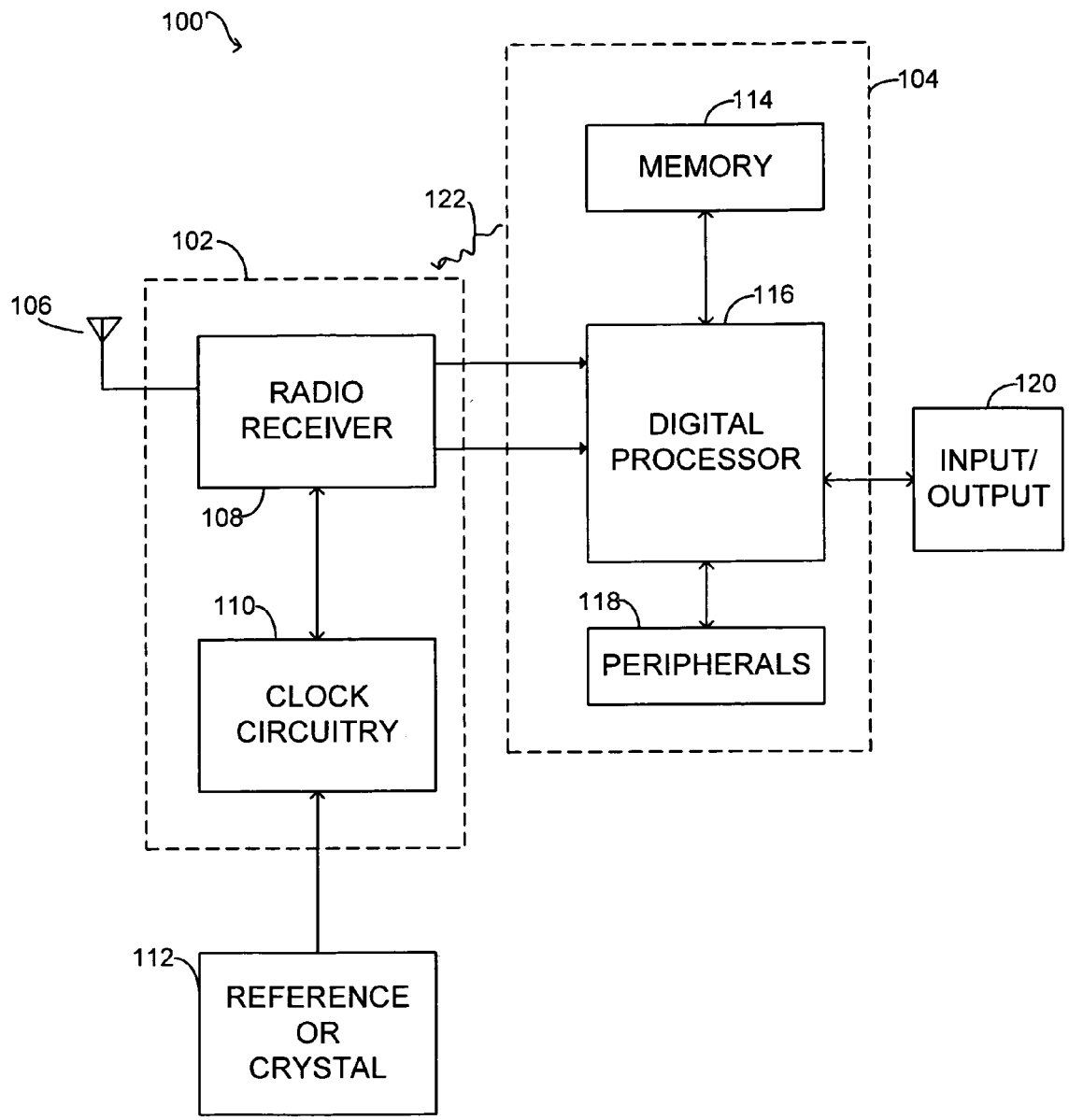
FIG. 1 illustrates a typical GPS receiver system.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

A GPS position determining system that is largely realized as an integrated circuit on a single substrate operates by alternating between a data collection mode and a processing mode. Other modes are possible in addition to the two modes mentioned herein without departing from the scope of the present invention. For example, data collection from GPS satellites may be suspended, but data collection from other sources, such as pseudolites, assistance networks such as the cellular network or Bluetooth networks, or other sources may be interleaved with these two modes in any fashion without departing from the scope of the present invention.

Implementation of this concept of alternating between two or more modes can be done in many ways. The time used to collect data is not specifically specified in this invention. For example, data collection can be performed for times much greater than 1 millisecond, and then processing is performed on the collected data. In this method, the satellite data is collected for a time period chosen to be long enough so that the data lost when processing the collected data has no effect on the sensitivity of the GPS function.

Another implementation of the present invention is to perform data collection for time periods around 1 millisecond, then process the data that has been collected. Still another implementation of the present invention is to collect data for time periods around 1 millisecond, then partially process the data. This sequence is repeated for a predetermined number of milliseconds, and then, after an accumulation period, the remaining processing is performed. Still another implementation of the invention is to perform data collection for time periods much less than 1 millisecond, then process the data that has been collected. Still another implementation of the present invention is to collect data for time periods much less than 1 millisecond, then partially process the data. This sequence is repeated for a predetermined time period, and after an accumulation period, the remaining processing is performed. As can be seen, the implementation of the present invention can vary greatly based on signal dynamics, processing capabilities, or other criteria that can be predetermined or defined by the user.

System Overview

A GPS position determining system predominantly has two sections. There is a radio receiver section and a digital processing section. In a realization where these two sections co-exist on a common substrate it is common for the electrical noise generated during processing to degrade the quality of the signals passing through the radio section. This can degrade the overall system performance. This invention addresses this issue by presenting a method of implementation of the system where the system alternates between a low noise mode where data is collected, and a processing mode where data is ignored.

Although described with respect to the Global Positioning System, it can be seen that the scope of the present invention can be used with other positioning systems, such as Galileo, GLONASS, or other satellite or terrestrial based positioning systems without departing from the scope of the present invention.

Specifics of the Invention

FIG. 1 is an illustration of a typical GPS receiver 100. GPS receiver 100 includes the GPS signal radio receiver section 102, and the digital processing section 104, which takes the satellite information and produces position information. The details of the inner workings of a receiver section 102 and digital processing section 104 in accordance with the present invention are described in U.S. Pat. No. 5,901,171, issued to Kohli, et al., which is incorporated by reference herein. It is also possible for the digital section to perform other functions, which would not affect the issues addressed by the present invention.

Antenna 106 receives signals from GPS satellites. Within radio receiver section 102, radio receiver 108 represents the Radio Frequency (RF) section, and clock circuitry 110 represents the timing and clock circuits needed to operate the radio receiver 108. Frequency reference 112 illustrates an external reference or crystal used to provide a reference frequency to the clock circuitry 110.

Within digital processing section 104, memory 114 illustrates the memory used by Digital Signal Processor (DSP) 116. Memory 114 may comprise various memory types scattered throughout the GPS receiver 100, such as flash memory, shadow memory, etc. In addition to the DSP 116, additional peripheral functions 118 can be included in the digital processing section 104. Peripheral functions 118 are functions that may be controlled or a factor in the operation of the DSP 116. Peripheral functions 118 can include such functions as timers, A/D converters, LCD interfaces, digital clocking circuitry, and other common functions. Input/output section 120 illustrates the external interface to DSP 116.

Although radio receiver section 102 and digital processing section 104 illustrates a typical grouping of digital functions in a typical GPS receiver 100, other blocks may be included in radio receiver section 102 and/or digital processing section 104 without departing from the scope of the present invention.

When an integrated circuit is designed, it is common to group functions to allow for noise isolation, and to minimize the area and interconnect lines. The radio functions that can be integrated are grouped in FIG. 1 and shown as radio receiver section 102, whereas the digital functions are grouped together as shown by digital section 104. The noise that couples between digital processing section 104 and radio receiver section 102 is shown as noise 122. Such noise 122 is undesirable, since it hinders radio receiver section 102 from properly performing the reception function for the GPS signals.

Figure 2:
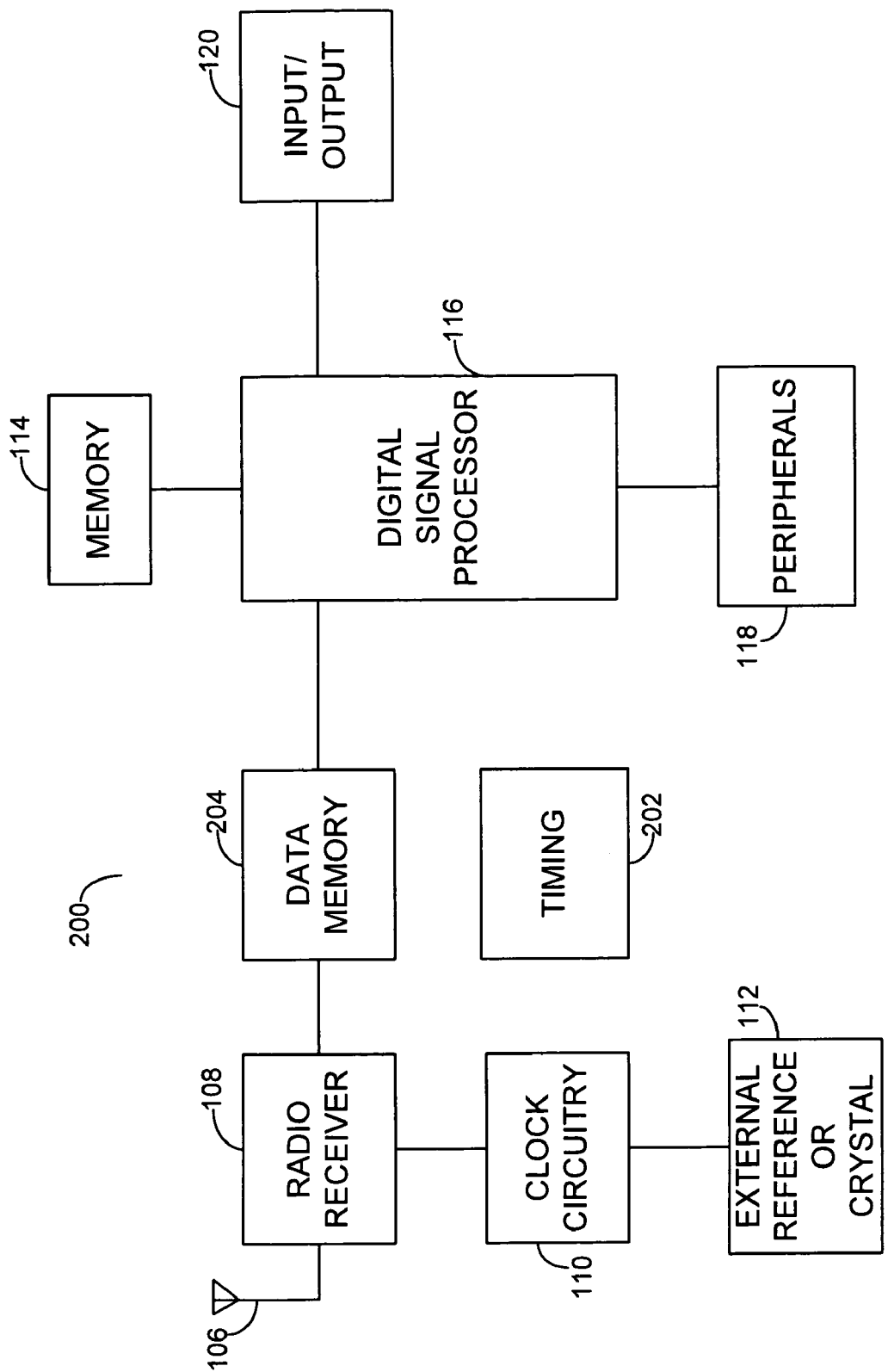
FIG. 2 illustrates a system in accordance with the present invention.

FIG. 2 illustrates a system 200 implementation block diagram for a GPS receiver that operates as described by the present invention. In this embodiment, the timing function, illustrated by block 202, shuts down or otherwise disables the DSP 116 while data is collected in the data memory 204. When sufficient time has passed that a desired amount of data exists in the data memory 204, timing function 202 resumes power, "turns on," or otherwise enables or re-enables the functions of the DSP 116, which then processes the data that has been stored in data memory 204. The noise generated by the timing function 202 activity has little or no impact on the system 200, because data is not collected during this time. During the data collection phase, a counter will increment to point to the memory position where data is to be stored. To minimize the noise generated by the counter, this counter could be a grey code counter. Timing function 202 can also contain a timing function to control both the data collection and the DSP 116 timing, or can contain a simple counter to wake up the DSP 116 after a predetermined amount of off time.

Figure 3:
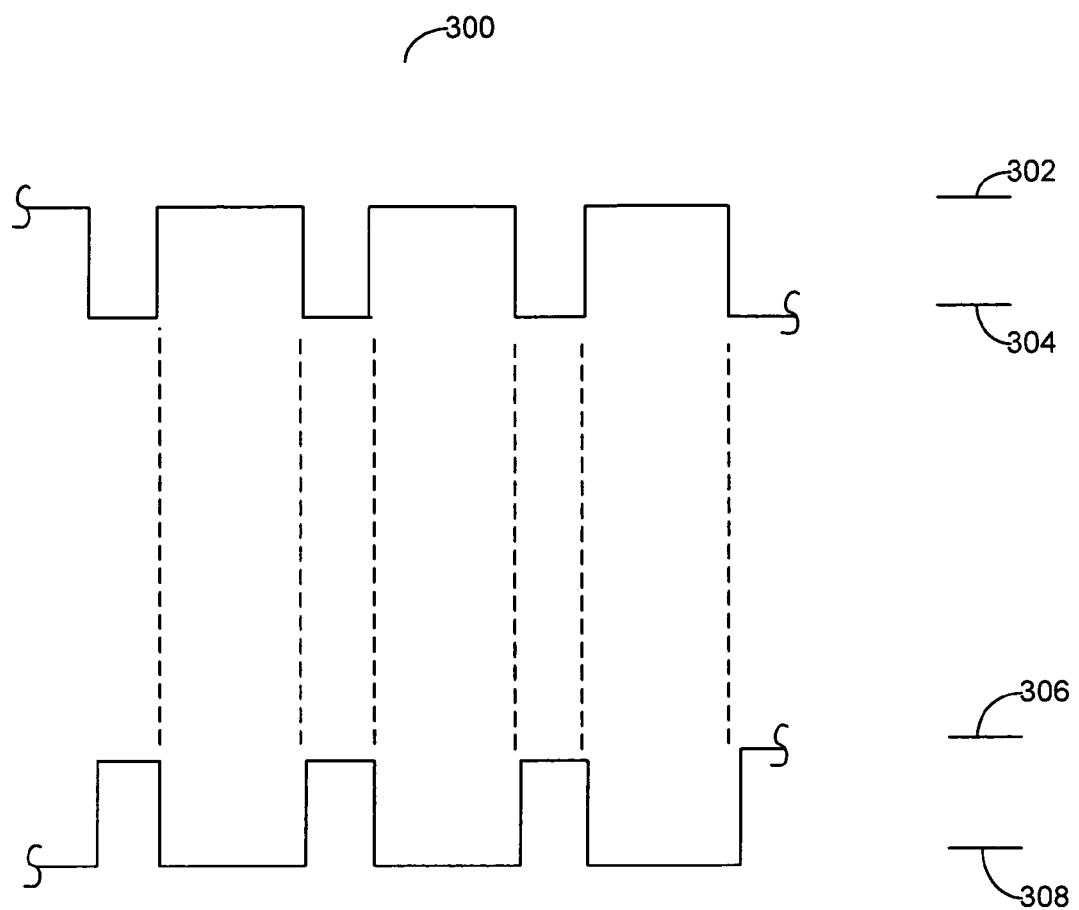
FIG. 3 illustrates the timing of the functions of the timing block of the present invention.

FIG. 3 illustrates the timing of the functions of the timing block of the present invention. Timing diagram 300 illustrates levels 302-308. Level 302 indicates the "on" position of the data collection and radio receiver 102, whereas level 304 indicates the "off" position of the data collection and radio receiver 102. Level 306 indicates the "on" position of the DSP 116, whereas level 308 indicates the "off" position of the DSP 116.

Although shown as a digital implementation, i.e., the DSP 116 is "on" at level 306 when the radio receiver 102 and data collection is "off" at level 304, other implementations can be envisioned within the scope of the present invention. For example, there can be a ramping function where the DSP is ramped down to a lower speed, and therefore a lower noise level, while data collection is taking place in the radio receiver 102, and then ramped up to a higher speed when data collection is no longer taking place. Further, there can be overlap between the on and off positions of both the radio receiver 102 and the DSP 116, which can occur once the GPS satellites have been located and tracking and/or navigation is occurring, since the receiver has some indication, once initial acquisition has occurred, which signals within the spread spectrum are of interest.

Conclusion

An invention which implements a GPS position determining system that is largely realized as an integrated circuit on a single substrate operates by alternating between a data collection mode, and a processing mode, is described herein.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims hereto.

What is claimed is:

1. A method of controlling an integrated circuit in a Global Positioning System ("GPS"), said integrated circuit comprising at least one radio receiver section, at least one data memory section, and at least one digital signal processing section, comprising:
   a) switching the digital signal processing section into a low noise mode in response to a predetermined timing function whereby the digital signal processing section operates in the low noise mode for a predetermined fixed time interval;
   b) collecting data with the radio receiver section and storing the data into the data memory section;
   c) switching the digital signal processing section into a processing mode in response to expiration of the predetermined fixed time interval; and
   d) processing the data collected in the data memory section using the digital signal processing section.

2. The method according to claim 1, wherein the sequence of steps is repeated.

3. The method according to claim 2, wherein the low noise mode of the digital signal processing section is accomplished by removing a clock source from the digital signal processing section.

4. The method according to claim 2, wherein the low noise mode of the digital signal processing section is accomplished by removing power from the digital signal processing section.

5. The method according to claim 2, wherein the low noise mode and the processing mode of the digital signal processing section are accomplished by changing the frequency of a clock used by the digital signal processing section.

6. The method according to claim 5, wherein the change in clock frequency is accomplished by switching between at least two frequencies.

7. The method according to claim 6, wherein the higher of the at least two frequencies of the clock used by the digital signal processing section is the frequency used by the digital signal processing section when it is in the processing mode.

8. The method according to claim 5, wherein the clock frequency is varied by a smooth transition between the low noise mode and the processing mode.

9.

10. An integrated circuit in a Global Positioning System ("GPS") comprising:
   at least one radio receiver section;
   at least one digital signal processing section having at least a processing mode and a low noise mode; and
   a timing section, wherein the timing section synchronizes switching of digital signal processing section modes with data collection in the radio receiver section in response to a predetermined timing function, whereby each of the digital signal processing section modes operates for a predetermined fixed time interval.

11. An integrated circuit according to claim 10, wherein the integrated circuit is formed from a single die.

12. An integrated circuit according to claim 10, wherein the low noise mode of the digital signal processing section is accomplished by either removing a clock from the digital signal processing section or holding the digital signal processing section in reset.

13. An integrated circuit according to claim 10, wherein the low noise mode of the digital signal processing section is accomplished by removing power from the digital signal processing section.

14. An integrated circuit according to claim 10, wherein the change in modes of the digital signal processing section is accomplished by changing the frequency of a clock used by the digital signal processing section.

15. A Global Positioning System ("GPS") receiver incorporating an integrated circuit formed from a single die comprising:
   at least one radio receiver section;
   at least one data memory section;
   at least one digital signal processing section having at least a processing mode and a low noise mode; and
   a timing section, wherein the timing section synchronizes switching of digital signal processing section modes with data collection in the radio receiver section in response to a predetermined timing function, whereby each of the digital signal processing section modes operates for a predetermined fixed time interval.

16. A GPS receiver according to claim 15, wherein the low noise mode of the digital signal processing section is accomplished by removing a clock source from the digital signal processing section.

17. A GPS receiver according to claim 15, wherein the low noise mode of the digital signal processing section is accomplished by removing power from the digital signal processing section.

18. A GPS receiver according to claim 15, wherein the change in modes of the digital signal processing section is accomplished by changing a frequency of a clock source used by the digital signal processing section.

19. A GPS receiver according to claim 18, wherein the radio receiver section automatically determines the clock frequency for the low noise mode.

* * * * *